US005640573A

United States Patent [19]
Gephardt et al.

[11] Patent Number: 5,640,573
[45] Date of Patent: Jun. 17, 1997

[54] POWER MANAGEMENT MESSAGE BUS FOR INTEGRATED PROCESSOR

[75] Inventors: Douglas D. Gephardt, Austin; James R. MacDonald, Buda, both of Tex.

[73] Assignee: Advanced Micro Devices, Inc., Sunnyvale, Calif.

[21] Appl. No.: 190,280

[22] Filed: Feb. 2, 1994

[51] Int. Cl.[6] ........................................................ G06F 1/32
[52] U.S. Cl. .................................................. 395/750
[58] Field of Search ................................. 395/750, 575, 395/550

[56] References Cited

U.S. PATENT DOCUMENTS

| | | | |
|---|---|---|---|
| 4,809,163 | 2/1989 | Hirosawa et al. | 395/750 |
| 4,851,987 | 7/1989 | Day | 395/750 |
| 5,083,266 | 1/1992 | Watanabe | 395/750 |
| 5,121,500 | 6/1992 | Arlington et al. | 395/750 |
| 5,129,091 | 7/1992 | Yorimoto et al. | 395/750 |
| 5,167,024 | 11/1992 | Smith et al. | 395/375 |
| 5,175,845 | 12/1992 | Little | 395/550 |
| 5,220,671 | 6/1993 | Yamagishi | 395/750 |
| 5,388,265 | 2/1995 | Volk | 395/750 |
| 5,390,350 | 2/1995 | Chung et al. | 395/750 |
| 5,392,437 | 2/1995 | Matter et al. | 395/750 |
| 5,396,636 | 3/1995 | Gallagher et al. | 395/750 |
| 5,404,546 | 4/1995 | Stewart | 395/750 |
| 5,410,712 | 4/1995 | Okuno | 395/750 |
| 5,410,713 | 4/1995 | White et al. | 395/750 |
| 5,410,714 | 4/1995 | Yorimoto et al. | 395/750 |

FOREIGN PATENT DOCUMENTS

| | | |
|---|---|---|
| 06 085 867 | 6/1994 | Japan . |
| WO-A-93 01542 | 1/1993 | WIPO . |

OTHER PUBLICATIONS

Ellis, S.C., "The Low Power Intel486 SL Microprocessor", *Digest of Papers Compcon*, (Feb. 22, 1993), Spring '93, pp. 96–102.

*Primary Examiner*—Ayaz R. Sheikh
*Attorney, Agent, or Firm*—Conley, Rose & Tayon, P.C.; B. Noel Kivlin

[57] ABSTRACT

An integrated processor is provided that includes a CPU core coupled to a variety of on-chip peripheral devices such as a DMA controller, an interrupt controller, and a timer. The integrated processor further includes a power management message unit coupled to the DMA controller, interrupt controller, and timer for monitoring the internal interrupt and bus request signals of the integrated processor. The power management message unit may also monitor other selected activities of the integrated processor depending upon the system requirements. Based on the detected activities, if any, the power management message unit encodes a message on a power management message bus to thereby provide information regarding the internal events of the integrated processor to an outside power management unit. The power management message bus is channeled from the integrated processor at a set of package pins that are isolated from the standard external peripheral bus of the integrated processor. By providing encoded information regarding the internal events of the integrated processor, monitoring of such events by an external power management unit is possible while the number of external pins on the integrated processor are minimized.

31 Claims, 4 Drawing Sheets

POWER MANAGEMENT MESSAGE BUS FOR INTEGRATED PROCESSOR

BACKGROUND OF THE INVENTION

1. Field of the Invention

This invention relates to integrated processors and more particularly to the power management of computer systems that employ integrated processors.

2. Description of the Relevant Art

An ongoing developmental goal of manufacturers has been to reduce the power consumption of computer systems. Reducing power consumption typically reduces heat generation of the system, thereby increasing reliability and decreasing cost. In addition, power reduction has been particularly important in maximizing the operating life of battery-powered portable computer systems.

Various techniques have been devised for reducing the power consumption of computer systems. These techniques include increasing the integration of circuitry and incorporation of improved circuitry and power management units (PMUs). One specific power reduction technique involves the capability of stopping clock signals that drive inactive circuit portions. A system employing such a technique typically includes a power management unit that detects or predicts inactive circuit portions and accordingly stops the clock signals associated with the inactive circuit portions. By turning off "unused" clock signals that drive inactive circuit portions, overall power consumption of the system is decreased. A similar technique involves the capability of reducing the frequency of clock signals that drive circuit portions during operating modes which are not time critical, and another technique involves the capability of removing power from inactive circuit portions.

Power managed computer systems that employ the above-described power reduction techniques typically monitor various activities at the point of use or by snooping centralized buses. For example, an activity monitor of a power management unit may be connected directly to various control lines associated with the microprocessor and peripheral devices to determine whether certain activities are occurring. Depending upon the detected activities, the power management unit may responsively power down selected circuit portions, reduce the frequencies of selected clock signals, and/or completely stop selected clock signals.

In recent years, integrated processors have been developed to replace previously discrete microprocessors and associated peripheral devices within computer systems. An integrated processor is an integrated circuit that performs the functions of both a microprocessor and various peripheral devices such as, for example, a memory controller, a DMA controller, a timer, and a bus interface unit, among other things. The introduction of integrated processors has allowed for decreases in the overall cost, size, and weight of computer systems, and has in many cases accommodated improved performance characteristics of the computer systems.

A problem encountered in the design of computer systems that incorporate integrated processors is that many points of monitoring are no longer available to an external power management unit. That is, since the CPU core and various peripheral devices are contained on a common integrated circuit chip, internal connections between the CPU core and the peripheral devices may not be accessible externally. Thus, certain system activities may be undetectable in real-time. Although external package pins could be provided on the integrated processor to provide external access directly to the selected internal points of monitoring, such dedicated pins would result in a significant increase in the overall pin count of the integrated processor and would further require that the die size of the integrated processor be increased to accommodate the additional bond wire pads. As a result, a significant cost would be added to the cost of the integrated processor.

SUMMARY OF THE INVENTION

The problems outlined above are in large part solved by an integrated processor including a power management message bus in accordance with the present invention. In one embodiment, an integrated processor is provided that includes a CPU core coupled to a variety of on-chip peripheral devices such as a DMA controller, an interrupt controller, and a timer. The integrated processor further includes a power management message unit coupled to the DMA controller, interrupt controller, and timer for monitoring the internal interrupt and bus request signals of the integrated processor. The power management message unit may also monitor other selected activities of the integrated processor depending upon the system power management requirements. Based on the detected activities, if any, the power management message unit encodes a message on a power management message bus to thereby provide information regarding the internal events of the integrated processor to an external power management unit. The power management message bus is channeled from the integrated processor at a set of package pins that are isolated from the standard external peripheral bus of the integrated processor. By providing encoded information regarding the internal events of the integrated processor, monitoring of such events by an external power management unit is possible while the number of external pins on the integrated processor are minimized.

Broadly speaking, the present invention contempates an integrated processor comprising a CPU core, an internal bus coupled to the CPU core, an on-chip peripheral device coupled to the internal bus, and a power management message unit coupled to the CPU core for detecting the occurrence of a predetermined activity of the integrated processor. A power management message bus is further provided coupled to the power management message unit, wherein the power management message bus is provided externally from the integrated processor via a set of external package pins, and wherein the power management message unit provides an encoded value on the power management message bus indicative of the internal activity.

The present invention further contemplates a computer system comprising an integrated processor including a CPU core and a power management message unit coupled to the CPU core, wherein the power management message unit is capable of detecting an internal activity of the integrated processor and of providing an encoded value indicative of the internal activity on an external set of terminals. The computer system further comprises a power management message bus coupled to the external set of terminals, and a power management unit coupled to the power management message bus for managing power within the computer system.

The present invention finally contemplates a method for managing power within a computer system, wherein the computer system includes an integrated processor having a CPU core and at least one on-chip peripheral device. The method comprises the steps of detecting an internal activity of the integrated processor, generating an encoded value indicative of the activity, providing the encoded value on an external power management message bus coupled to the integrated processor, and receiving the encoded value at a power management unit.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
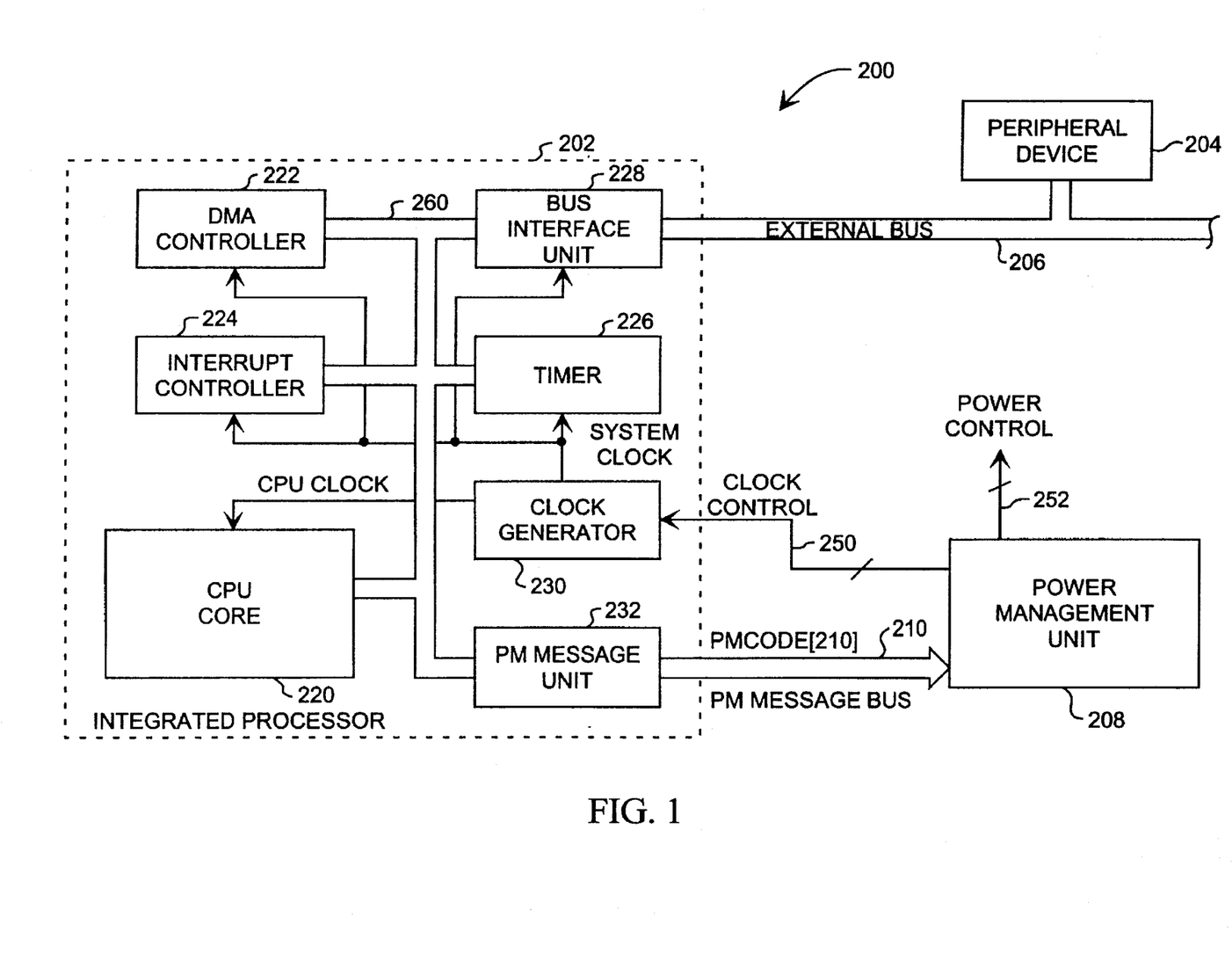
FIG. 1 is a block diagram of an integrated processor including a power management message bus in accordance with the present invention.

Referring now to FIG. 1, a block diagram is shown of a computer system 200 including an integrated processor 202 coupled to a peripheral device 204 via an external bus 206. Integrated processor 202 is further coupled to a power management unit 208 via a power management message bus 210.

Integrated processor 202 includes a CPU core 220 coupled to a variety of on-chip peripheral devices such as a DMA (direct memory access) controller 222, an interrupt controller 224, and a timer 226. CPU core 220 is coupled to external bus 206 via an on-chip bus interface unit 228. A clock generator 230 and a power management (PM) message unit 232 are further incorporated within integrated processor 202. The operation of clock generator 230 and power management message unit 232 will be described in further detail below.

External bus 206 is illustrative of, for example, a PCI local bus. It is noted that other bus standards such as the ISA or EISA bus standards could be alternatively employed. Peripheral device 204 is illustrative of any externally connectable peripheral device such as a video controller, a disk drive, or a printer.

Power management unit 208 is provided for managing and minimizing the power consumed by computer system 200. The power management unit 208 receives an encoded signal PMCODE [2:0] on power management message bus 210. The encoded signal PMCODE[2:0] is indicative of certain activities that occur within integrated processor 202, as will be described below. Power management unit 208 generates a set of clock control signals at lines 250 and a set of power control signals at lines 252. The clock control signals and the power control signals are used, respectively, to control the frequencies of selected clock signals and to control the application of power to selected circuit portions. Specifically, the clock control signals are received by clock generator 230 which generates a CPU clock signal and a system clock signal. The frequencies of the CPU clock signal and the system clock signal are dependent upon the clock control signals generated by power management unit 208. The power control signals on lines 252 are provided to control the application of power to selected circuit portions that comprise computer system 200 such as peripheral device 204. It is understood that certain power control signals may be provided to integrated processor 202 to control the application of power to various internal circuit portions of integrated processor 202.

CPU core 220 is a data processing unit that implements a predetermined instruction set, such as the model 80486 microprocessor instruction set. CPU core 220 further includes a floating-point coprocessing subunit. DMA controller 222 is provided for controlling data transfers between a system memory (not shown) and various I/O peripheral devices (also not shown). Interrupt controller 224 is provided for interfacing, priortizing, and masking various interrupt signals associated with computer system 200. Timer 226 is provided for general purpose timing functions, including the generation of a timer tick interrupt signal. Finally, bus interface unit 228 is provided for orchestrating and controlling the transfer of data, address, and control signals between external bus 206 and an internal bus 260. It is noted that DMA controller 222, interrupt controller 224, timer 226, and bus interface unit 228 may be fabricated in accordance with a variety of known circuit implementations.

Figure 2:
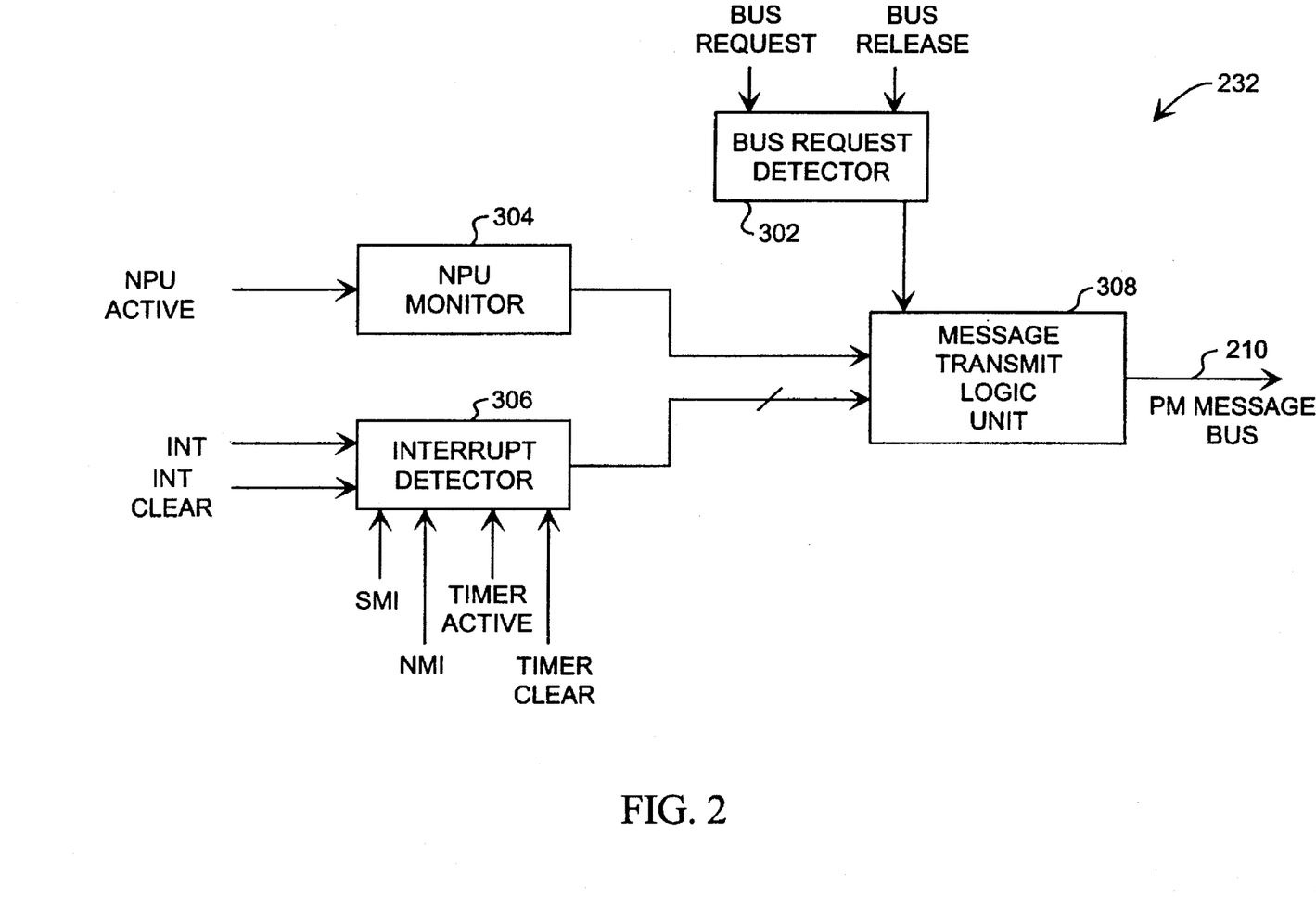
FIG. 2 is a block diagram of a power management message unit incorporated within the integrated processor of FIG. 1.

Referring next to FIG. 2, a block diagram is shown of the power management message unit 232. As illustrated in the figure, the power management message unit 232 includes a bus request detector 302, an NPU monitor 304, and an interrupt detector 306 coupled to a message transmit logic unit 308. The bus request detector 302 is capable of detecting a bus request signal associated with bus 260, and is capable of detecting the subsequent release of the bus 260. It is noted that the bus request signal may be generated by DMA controller 222 or by bus interface unit 228 (which asserts the bus request signal in response to an external bus master). NPU monitor 304 is coupled to CPU core 220 and is capable of detecting when the coprocessing subunit of CPU core 220 is active. Interrupt detector 306 is coupled to interrupt controller 224 and CPU core 220 and is capable of detecting the assertions of an interrupt signal INT, a nonmaskable interrupt signal NMI, a system management interrupt signal SMI, and a timer tick interrupt signal. Interrupt detector 306 is further capable of detecting when a corresponding interrupt service and a corresponding timer tick service have cleared.

Depending upon the system activity as detected by bus request detector 302, NPU monitor 304, and interrupt detector 306, message transmit logic unit 308 issues an encoded signal on the power management message bus 210. The encoding of the power management message bus 210 is indicated below in Table I.

TABLE I

| Internal Event | Bit Definition PMCODE[2:0] | Description |
|---|---|---|
| PM Bus NOP | 000 | May be used as a no-operation command. |
| NPU Active | 001 | The start of an NPU instruction has been detected. |
| Bus request | 010 | Either an external bus master or the internal DMA controller is active. |
| NMI occurred | 011 | A non-maskable interrupt was generated to the CPU. |
| SMI Active | 100 | A system management mode interrupt was generated to the CPU. |
| Interrupt Active | 101 | At least one interrupt service routine is in progress, excluding timer interrupts. |
| Timer Active | 110 | A timer interrupt is pending or in service. |
| All Clear | 111 | Indicates that any bus request or interrupt service has completed. |

As indicated in Table I, the power management message bus 210 is driven with a PMCODE [2:0] value of 001 when the start of a co-processor instruction has been detected by NPU monitor 304. The power management message bus 210 is driven with a PMCODE [2:0] value of 010 if either an external bus master or the internal DMA controller 222 is active, as detected by bus request detector 302. A PMCODE [2:0] value of 011 is driven on the power management message bus 210 if a non-maskable interrupt is received by CPU core 220, and a PMCODE [2:0] value of 100 is driven on power management message bus 210 if a system management mode interrupt is received by CPU core 220. A PMCODE [2:0] value of 101 is driven on the power management message bus 210 if at least one interrupt service routine is in progress, excluding timing interrupts, and a PMCODE [2:0] value of 110 is driven on the power management message bus 210 if a timer interrupt is pending or is in service. Finally, a PMCODE [2:0] value of 111 is driven on the power management message bus 210 if any bus request or interrupt service previously indicated has completed.

Figure 3:
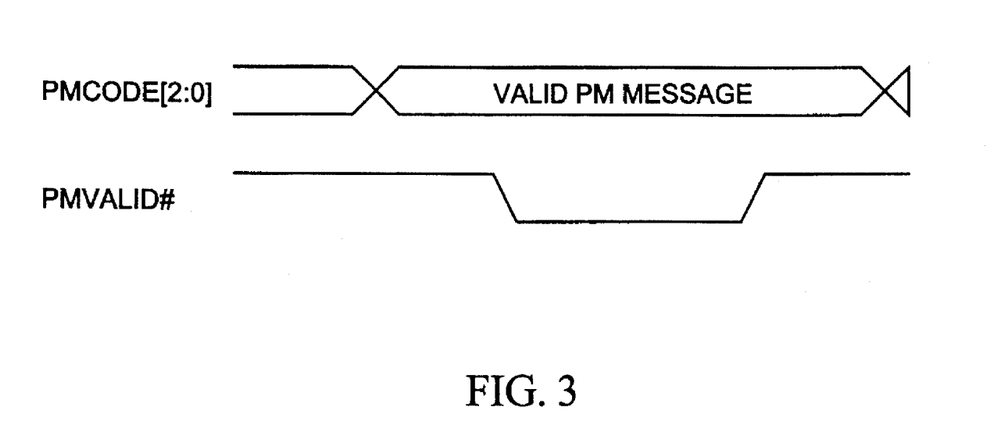
FIG. 3 is a timing diagram that illustrates a message transmit cycle executed by the power management message unit of FIG. 1.

FIG. 3 is a timing diagram that illustrates a message transmit cycle executed by message transmit logic unit 308. As illustrated, when the occurrence of a monitored activity has been detected, or when the completion of a monitored activity has been detected, the PMCODE [2:0] lines of power message bus 210 are driven with a valid encoded message in accordance with values defined in Table I. A validation strobe signal labeled PMVALID# is simultaneously asserted on power management message bus 210 to indicate that a valid message is being driven on lines PMCODE [2:0].

Figure 4:
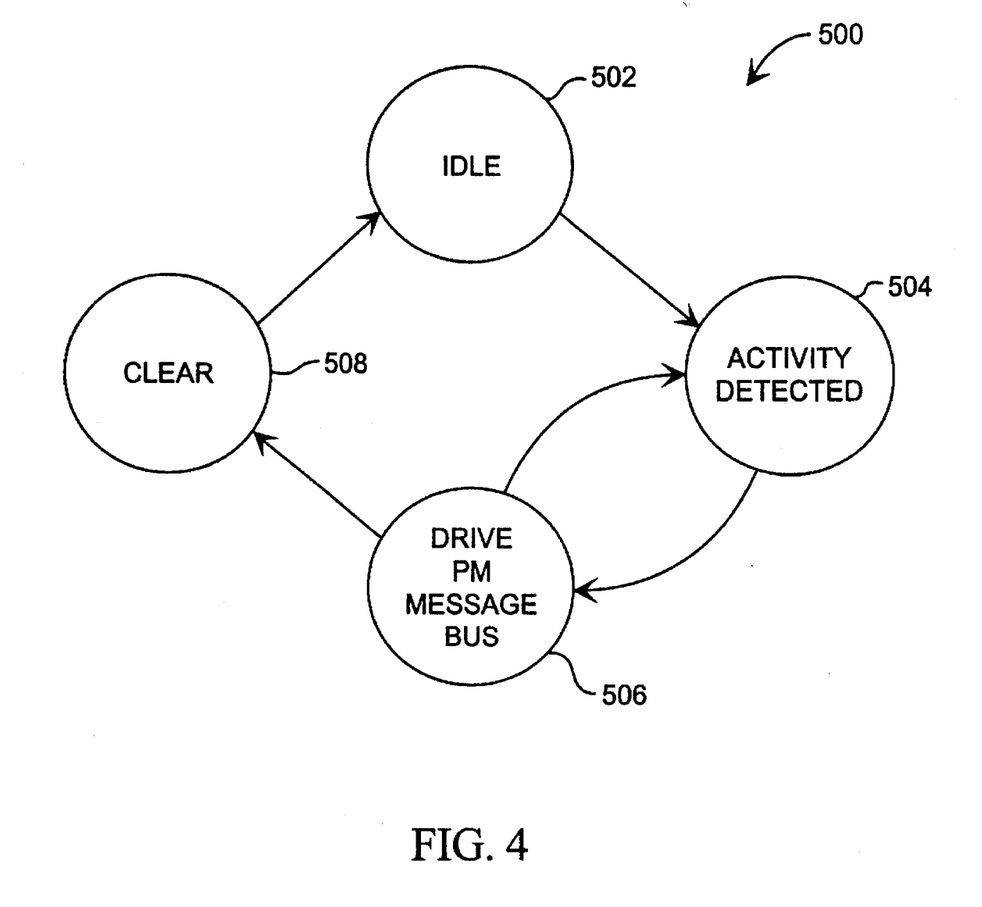
FIG. 4 is a diagram of an algorithmic state machine embodied within the power management message unit of FIG. 1.

FIG. 4 is a diagram of an algorithmic state machine 500 embodied within message transmit logic unit 308. State machine 500 enters a idle state 502 upon system reset, and transitions to state 504 when a monitored activity is detected by either bus request detector 302, NPU monitor 304, or interrupt detector 306. The type of detected activity is determined during state 504. State machine 500 next transitions to state 506 during which a valid message in accordance with the encoded values of Table I is driven on lines PMCODE [2:0] of the power management message bus 210. The validation strobe PMVALID# is further asserted during state 506. If additional activity is detected during state 506, state machine 500 transitions back to state 504, determines the type of activity detected, and reverts back to state 506 and drives the power management message bus 210 accordingly. When all interrupts have been cleared and all bus requests have been deasserted, the state machine 500 enters state 508 during which an encoded "All Clear" message is broadcast on the power management message bus 210. The validation strobe PMVALID# is again asserted during state 508 when the all clear message is asserted on lines PMCODE [2:0]. Following the all clear message, state machine 500 reverts back to idle state 502.

Referring back to FIG. 1, power management unit 208 latches each message transmitted by power management message unit 232 upon the assertion of the validation strobe PMVALID#. When power management unit 208 receives a new message, it controls the clock control signals at lines 250 and the power control signals 252 in accordance with a predetermined power management algorithm. For example, when the all clear message is received by power management unit 208 from power management message unit 232, the power management unit 208 may drive the clock control signals at lines 250 such that the frequencies of the CPU clock signal and the system clock signal are reduced or such that the CPU clock signal and/or the system clock signal is stopped. Power management unit 208 may similarly drive the power control signals at lines 252 to remove power from selected peripheral devices and/or subunits of computer system 200. Depending upon subsequent system activity that may be reported on power management message bus 210, the power management unit 208 controls the clock control signals such that the frequencies of the CPU clock signal and the system clock signal are raised, and such that the power control signals are driven to reapply power to selected peripheral devices and subunits of computer system 200.

It is noted that the power management message bus for an integrated processor as described above may be employed within a system that includes the further circuitry and techniques described within the copending, commonly assigned patent applications: "Power Management Unit Including Software Configurable State Register and Time-Out Counters for Protecting Against Misbehaved Software", by O'Brien, et al., Ser. No., 08/190,279, filed concurrently herewith; "Power Management System for an Integrated Processor", by O'Brien, et al., Ser. No. 08/190,292, filed concurrently herewith; "Periodic System Management Interrupt Source and Power Management System Employing the Same", by Wisor, et al., Ser. No. 08/190,597, filed concurrently herewith; "Immediate System Management Interrupt Source with Associated Reason Register", by Wisor, et al., Ser. No. 08/190,285, filed concurrently herewith; and "High Performance Integrated Processor Architecture", by Gephardt, et al., Ser. No. 08/190,647, filed concurrently herewith. It is further noted that interrupt controller 224 may be implemented in accordance with the copending, commonly assigned patent application entitled "Interrupt Controller With In-Service Indication", by MacDonald et al., Ser. No. 08/125,336, filed Sep. 22, 1993. The above copending, commonly assigned patent applications are incorporated herein by reference in their entirety.

It is further noted that while the power management message unit 232 of FIG. 1 detects the specific activities as indicated within Table I, other internal system activities may be alternatively or additionally detected and indicated via power management message bus 210. For example, the power management message unit may be configured with a decoder to snoop the internal bus 260 to detect the execution of selected bus cycles. In addition, while the power management unit 208 of FIG. 1 controls the generation of various clock signals within computer system 200 as well as the application of power to various peripheral devices and subunits of computer system 200, the power management unit 208 may be configured to control only selected clock signals of computer system 200 or to control only the application of power to various peripheral devices.

Numerous variations and modifications will become apparent to those skilled in the art once the above disclosure is fully appreciated. It is intended that the following claims be interpreted to embrace all such variations and modifications.

What is claimed is:

1. An integrated processor comprising:
    a CPU core;
    an internal bus coupled to said CPU core;
    an on-chip peripheral device coupled to said internal bus;
    a power management message unit coupled to said CPU core for detecting the occurrence of a predetermined activity of said integrated processor; and
    a power management message bus coupled to said power management message unit, wherein said power management message bus is provided externally from said integrated processor via a set of external package pins, and wherein said power management message unit provides an encoded value on said power management message bus indicative of said predetermined activity, said encoded value being decodable by a power management unit external to said integrated processor for managing power to said integrated processor;
    wherein said CPU core, said on-chip peripheral device and said power management message unit are fabricated on a common semiconductor substrate.

2. The integrated processor as recited in claim 1 wherein said power management message unit includes an interrupt detector for detecting the assertion of an interrupt signal.

3. The integrated processor as recited in claim 2 wherein said power management message unit includes a bus request detector for detecting the assertion of a bus request signal from a peripheral device on said internal bus, wherein said power management message unit provides a first encoded value on said power management message bus in response to the assertion of said interrupt signal, and wherein said power management message unit provides a second encoded value on said power management message bus in response to the assertion of said bus request signal.

4. The integrated processor as recited in claim 3 wherein said power management message unit is further configured to detect when an interrupt service has completed, and wherein said power management message unit provides a third encoded value on said power management message bus in response to the completion of said interrupt service.

5. The integrated processor as recited in claim 1 wherein said predetermined activity includes the assertion of a bus request signal on said internal bus.

6. The integrated processor as recited in claim 1 further comprising a DMA controller for controlling data transfers coupled to said CPU core.

7. The integrated processor as recited in claim 5 further comprising a DMA controller coupled to said CPU core, wherein said DMA controller is capable of generating said bus request signal.

8. The integrated processor as recited in claim 1 wherein said predetermined activity includes co-processor activity within said CPU core.

9. The integrated processor as recited in claim 1 further comprising a bus interface unit for interfacing said internal bus to an external peripheral bus.

10. The integrated processor as recited in claim 9 wherein said external peripheral bus is isolated from said power management message bus.

11. The integrated processor as recited in claim 9 wherein said power management message bus is asynchronous with respect to said external peripheral bus.

12. The integrated processor as recited in claim 1 wherein said power management message unit asserts a validation strobe when said encoded value is provided on said power management message bus.

13. A computer system comprising:
    an integrated processor including a CPU core and a power management message unit coupled to said CPU core, said CPU core and said power management message unit being fabricated on a single semiconductor substrate, wherein said power management message unit is configured to detect internal activity of said integrated processor and to provide an encoded value indicative of said internal activity on an external set of terminals;
    a power management message bus coupled to said external set of terminals; and
    a power management unit coupled to said power management message bus for decoding said encoded value and managing power within said computer system responsive to said encoded value.

14. The computer system as recited in claim 13 wherein said power management message unit includes an interrupt detector for detecting the assertion of an interrupt signal.

15. The computer system as recited in claim 14 wherein said power management message unit further includes a bus request detector for detecting the assertion of a bus request signal of said integrated processor.

16. The computer system as recited in claim 15 wherein said integrated processor further includes a DMA controller coupled to said CPU core, wherein said DMA controller is configured to generate said bus request signal.

17. The computer system as recited in claim 16 wherein said power management message unit is further configured to detect co-processor activity within said CPU core.

18. A method for managing power within a computer system, wherein said computer system includes an integrated processor having a CPU core and at least one on-chip peripheral device, said method comprising the steps of:
    detecting an assertion of a bus request signal on an internal bus of said integrated processor;
    detecting an assertion of an interrupt signal on said integrated processor;
    generating a first encoded value indicative of said bus request signal;
    generating a second encoded value indicative of said interrupt signal;
    providing said first encoded value on an external power management message bus coupled to said integrated processor;
    providing said second encoded value on said external power management message bus coupled to said integrated processor;
    receiving said first encoded value at a power management unit;
    receiving said second encoded value at said power management unit; and said power management unit generating a first control signal responsive to said first encoded value and a second control signal responsive to said second encoded value.

19. The method for managing power within a computer system as recited in claim 18 comprising generating a validation strobe simultaneously with providing said first encoded value on said external power management message bus and said second encoded value on said external power management message bus.

20. An integrated processor comprising:

a CPU core;

an internal bus coupled to said CPU core;

an on-chip peripheral device coupled to said internal bus;

a power management message unit coupled to said CPU core for detecting the occurrence of a predetermined activity of said integrated processor, said power management message unit including an interrupt detector for detecting the assertion of an interrupt signal, and a bus request detector for detecting the assertion of a bus request signal from a peripheral device on said internal bus; and a power management message bus coupled to said power management message unit, wherein said power management message bus is provided externally from said integrated processor via a set of external package pins, and wherein said power management message unit provides an encoded value on said power management message bus indicative of said predetermined activity, said encoded value being decodable by a power management unit external to said integrated processor for managing power to said integrated processor;

wherein said predetermined activity includes said assertion of said interrupt signal, and said power management message unit provides a first encoded value on said power management message bus in response to the assertion of said interrupt signal; and wherein said predetermined activity includes said assertion of said bus request signal, and said power management message unit provides a second encoded value on said power management message bus in response to the assertion of said bus request signal.

21. The integrated processor as recited in claim 20 wherein said power management message unit is further configured to detect when an interrupt service has completed, and wherein said power management message unit provides a third encoded value on said power management message bus in response to the completion of said interrupt service.

22. The integrated processor as recited in claim 20 further comprising a DMA controller for controlling data transfers coupled to said CPU core.

23. The integrated processor as recited in claim 20 further comprising a DMA controller coupled to said CPU core, wherein said DMA controller is capable of generating said bus request signal.

24. The integrated processor as recited in claim 20 wherein said predetermined activity includes co-processor activity within said CPU core.

25. The integrated processor as recited in claim 20 further comprising a bus interface unit for interfacing said internal bus to an external peripheral bus.

26. The integrated processor as recited in claim 25 wherein said external peripheral bus is isolated from said power management message bus.

27. The integrated processor as recited in claim 20 wherein said power management message unit asserts a validation strobe when said first encoded value is provided on said power management message bus and said power management message unit asserts said validation strobe when said second encoded value is provided on said power management message bus.

28. The integrated processor as recited in claim 27 wherein said power management message bus is asynchronous with respect to said external peripheral bus.

29. A computer system comprising:

an integrated processor including a CPU core and a power management message unit coupled to said CPU core, wherein said power management message unit is configured to detect internal activity of said integrated processor and to provide an encoded value indicative of said internal activity on an external set of terminals, wherein said power management message unit includes an interrupt detector for detecting the assertion of an interrupt signal and said power management message unit includes a bus request detector for detecting the assertion of a bus request signal from a peripheral device on said internal bus;

a power management message bus coupled to said external set of terminals; and a power management unit coupled to said power management message bus for decoding said encoded value and managing power within said computer system responsive to said encoded value;

wherein said power management message unit provides a first encoded value on said power management message bus in response to the assertion of said interrupt signal, and wherein said power management message unit provides a second encoded value on said power management message bus in response to the assertion of said bus request signal.

30. The computer system as recited in claim 29 wherein said integrated processor further includes a DMA controller coupled to said CPU core, wherein said DMA controller is configured to generate said bus request signal.

31. The computer system as recited in claim 30 wherein said power management message unit is further configured to detect co-processor activity within said CPU core.

* * * * *

UNITED STATES PATENT AND TRADEMARK OFFICE
CERTIFICATE OF CORRECTION

PATENT NO. : 5,640,573

DATED : June 17, 1997

INVENTOR(S) : Douglas D. Gephardt and James R. MacDonald

It is certified that error appears in the above-identified patent and that said Letters Patent is hereby corrected as shown below:

```
Claim 8, col. 7, line 65, please replace the word "includes" with
the word "is".
```

Signed and Sealed this

Ninth Day of December, 1997

Attest:

BRUCE LEHMAN

Attesting Officer

Commissioner of Patents and Trademarks